(12) United States Patent
Kamatani

(10) Patent No.: US 6,947,231 B2
(45) Date of Patent: Sep. 20, 2005

(54) MAGNETIC TRANSFER HOLDER AND MAGNETIC TRANSFER DEVICE

(75) Inventor: Akito Kamatani, Odawara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 5 days.

(21) Appl. No.: 10/809,830

(22) Filed: Mar. 26, 2004

(65) Prior Publication Data
US 2004/0190170 A1 Sep. 30, 2004

(30) Foreign Application Priority Data

Mar. 27, 2003 (JP) .................................... 2003-087892

(51) Int. Cl.$^7$ .................................................. G11B 5/86
(52) U.S. Cl. ............................. 360/17; 360/15; 360/16
(58) Field of Search .................. 360/15–17; 428/65.3, 428/328

(56) References Cited

U.S. PATENT DOCUMENTS

| | | | | |
|---|---|---|---|---|
| 5,935,674 A | * | 8/1999 | Saito et al. ............... | 428/65.3 |
| 6,804,070 B2 | * | 10/2004 | Aoki et al. ................ | 360/17 |
| 6,877,165 B1 | * | 4/2005 | Aoki ........................ | 720/710 |
| 2002/0030909 A1 | | 3/2002 | Aoki et al. | |
| 2003/0048557 A1 | * | 3/2003 | Nishikawa et al. .......... | 360/17 |

* cited by examiner

*Primary Examiner*—David Hudspeth
*Assistant Examiner*—Dismery Mercedes
(74) *Attorney, Agent, or Firm*—Sughrue Mion, PLLC

(57) ABSTRACT

A magnetic transfer holder holds a contact body including superimposed master information carriers bearing transfer information in pattern areas and a slave medium. At least one of the two sides of the contact body is held via an elastic body. A surface of this elastic body that faces the master information carrier is circular. An outer diameter D1 of this elastic body is smaller than an outer diameter D2, which is the smaller one of an outer diameter of the master information carrier and that of the slave medium, and larger than an outer diameter D3 of the pattern area. A diameter d1 of a center hole of the elastic body is larger than an outer diameter d2, which is the larger one of a center hole of the master information carrier and that of the slave medium, and smaller than an inner diameter d3 of the pattern area.

17 Claims, 11 Drawing Sheets

MAGNETIC TRANSFER HOLDER AND MAGNETIC TRANSFER DEVICE

BACKGROUND OF THE INVENTION

1. Field of the Invention

The present invention relates to a magnetic transfer holder which is used in magnetic transfer of information, from a master information carrier that bears the information, to a slave medium, and a magnetic transfer device.

2. Description of the Related Art

Magnetic transfer is the subject matter of the present invention. The object of magnetic transfer is to transfer and record a magnetization pattern corresponding to information, which is borne by a master information carrier, to a slave medium. This is accomplished by applying a transfer magnetic field in a state in which the master information carrier (patterned master) having a magnetic layer at least on its surface, in which a transfer pattern such as servo signals is formed as an uneven pattern or as embedded structures, contacts the slave medium which has a magnetic recording portion.

When the foregoing slave medium is a discoid medium such as a hard disk or a high-density flexible disk, the transfer magnetic field is applied by arranging a magnetic field application device comprising an electromagnet device or a permanent magnet device on one or both sides of the contact body comprising the slave medium and the master information carriers, in a state in which the discoid master information carriers contact a single side or both sides of this slave medium.

In order to improve transfer quality in this magnetic transfer, how uniformly the slave medium and the master information carrier contact each other is an important issue. That is, when there is a contact fault, an area receiving no magnetic transfer is caused. When magnetic transfer is not performed, signal drop-outs arise in the magnetic information transferred to the slave medium, and the signal quality level deteriorates. In this regard, when the recorded signal is a servo signal, a tracking function is not fully obtained and reliability is decreased.

In this regard, in the magnetic transfer as above, it is favorable that the master information carrier and the slave medium are housed inside of a magnetic transfer holder having a holder on a first side and a holder on a second side, that face and contact each other, in order to obtain uniform contact over the entire contact area (for example, refer to U.S. Patent Laid-Open No. 20020030909).

However, there has been a problem that obtaining close contact over the entire contact area is difficult due to a difference of flatness among the master information carrier, the slave medium, and the holder. Therefore, it has been proposed that an elastic body should be interposed when housing the master information carrier and the slave medium.

However, when magnetic transfer was performed by using a holder tightly holding a contact body comprising the master information carrier and the slave medium via the elastic body, damage or deformation occurred to the edges of the master information carrier and the slave medium. This was because pressure was intensively applied onto the outer and inner peripheries of the slave medium and the master information carrier when applying pressure to improve contact between the slave medium and the master information carrier. Further, at portions slightly inward from the outer and inner peripheral edges, some areas receiving low pressure were generated, wherein the signal quality level deteriorated.

SUMMARY OF THE INVENTION

In view of the foregoing observations and description, an object of the present invention is to provide a magnetic transfer holder and a magnetic transfer device which can enable excellent magnetic transfer by securely contacting a slave medium and a master information carrier without causing damage to the slave medium and the master carrier.

A first magnetic transfer holder of the present invention is a magnetic transfer holder which sandwiches and holds therein a contact body comprising a discoid master information carrier having a toroidal pattern area bearing transfer information on its front surface, and a discoid slave medium receiving the foregoing transfer information from the master information carrier, via elastic bodies placed at least on one of the two sides, wherein at least a front surface of the elastic body that faces the contact body is circular, and an outer diameter D1 of the circular front surface of the foregoing elastic body is smaller than an outer diameter D2 which is the smaller one of an outer diameter of the master information carrier and an outer diameter of the slave medium.

It is desirable that the magnetic transfer holder of the present invention sandwiches and holds the foregoing contact body via the foregoing elastic bodies placed on both sides of the contact body.

A shape of a rear face of the foregoing elastic body can be any shape, as long as the front surface is circular. Further, an inclined portion can be provided on a lateral surface.

It is desirable that a difference between the foregoing outer diameter D1 and the foregoing outer diameter D2 is between 0.2 mm and 4 mm, inclusive. When the difference between the diameters is smaller than 0.2 mm, it is difficult to precisely arrange the elastic body so that the elastic body does not protrude from the master information carrier. Meanwhile, when a difference between the relevant diameters becomes larger than 4 mm, pressure at the edges of the inner and outer diameters becomes low, and signal quality level in the vicinity of the edges may deteriorate.

Further, it is desirable that the foregoing outer diameter D1 is larger than a diameter D3 of the foregoing pattern area. In this case, it is desirable that a difference between the foregoing outer diameter D1 and the foregoing outer diameter D3 is 4 mm or less.

Further, when at least one of the foregoing master information carrier and the foregoing slave medium has a center hole, it is desirable that the circular front surface of the foregoing elastic body has a center hole, and a diameter d1 of the center hole is larger than a diameter d2 which is the larger one of a diameter of the center hole of the foregoing master information carrier and a diameter of the center hole of the foregoing slave medium.

When only one of the foregoing master information carrier and the foregoing slave medium has a center hole, "the larger one of a diameter of the center hole of the foregoing master information carrier and a diameter of the center hole of the foregoing slave medium" means a diameter of the center hole of either the foregoing master carrier or the foregoing slave medium, which has a center hole.

A center hole in the front surface of the elastic body can be a hole which penetrates the elastic body.

It is desirable that a difference between the foregoing diameter d1 and the foregoing diameter d2 is between 0.2 mm and 4 mm, inclusive.

Further, it is desirable that the foregoing diameter d1 is smaller than an inner diameter d3 of the foregoing pattern area. In this case, it is desirable that a difference between the foregoing diameter d1 and the foregoing inner diameter d3 is 4 mm or less.

In the present invention, when the master information carriers are respectively arranged on both sides of the slave medium, it is not always necessary that outer diameters and diameters of center holes of the two master information carriers are identical. In this case, the smallest outer diameter among outer diameters of the slave medium and two master information carriers is set to D2, and the largest diameter among their diameters of center holes is set to d2.

A second magnetic transfer holder of the present invention is a magnetic transfer holder which sandwiches and holds therein a contact body comprising a discoid master information carrier having a toroidal pattern area bearing transfer information on its front surface, and a discoid slave medium receiving the foregoing transfer information from the master information carrier, via elastic bodies placed at least on one of the two sides, wherein at least a front surface of the elastic body that faces the contact body is circular, at least one of the master information carrier and the slave medium has a center hole, the circular front surface of the elastic body has a center hole, and a diameter d1 of the center hole is larger than an diameter d2 which is the larger one of a diameter of the center hole of the foregoing master information carrier and a diameter of the center hole of the foregoing slave medium.

In this regard, it is desirable that a difference between the foregoing diameter d1 and the foregoing diameter d2 is between 0.2 mm and 4 mm, inclusive.

Further, it is desirable that the foregoing diameter d1 is smaller than an inner diameter d3 of the foregoing pattern area. In this case, it is desirable that a difference between the foregoing diameter d1 and the foregoing diameter d3 is 4 mm or less.

Further, in the foregoing respective magnetic transfer holders of the present invention, it is desirable that the thickness of the elastic body is between 0.1 mm and 3 mm, and a degree of elasticity of the foregoing elastic body is from 0.5 MPa to 200 MPa. It is more preferable that the thickness of the elastic body is 0.5 mm or more.

Specific materials for the foregoing elastic body include fluorine rubber, urethane rubber, nitrile rubber, ethylene propylene rubber, silicon rubber, neoprene rubber, viton rubber, butadiene rubber, natural rubber and the like.

A magnetic transfer device of the present invention is a magnetic transfer device, wherein magnetic transfer is performed by using the foregoing magnetic transfer holder of the present invention in a state in which pressure is applied onto two sides of the foregoing contact body.

In the magnetic transfer device of the present invention, it is desirable that a maximum value of pressure applied onto each portion of the foregoing pattern area is 2 MPa or less.

It is desirable that, regarding variation of pressure applied onto each portion of the foregoing pattern area, a maximum pressure $P_{max}$ is twice or less than a minimum pressure $P_{min}$.

As a pressurization method to apply pressure onto the two sides of the foregoing contact body, any of the following methods is possible: a pressurization method that hermetically closes the interior of the foregoing magnetic transfer holder, and depressurizing this hermetically closed space; a mechanical pressurization method by using a source of power; and a pressurization method combining the foregoing two methods.

According to the first magnetic transfer holder of the present invention, the outer diameter D1 of the circular front surface of the elastic body is smaller than the outer diameter D2, which is the smaller one of the outer diameter of the master information carrier and the outer diameter of the slave medium. Therefore, intensive pressurization on the edges of the outer peripheries of the master information carrier and the slave medium is prevented, and no damage is caused to the edges of the outer peripheries of the master information carrier and the slave medium. Further, since the master information carrier and the like do not bite into outer periphery of the elastic body, no damage is caused to the elastic body.

Further, when the master information carrier and the slave medium, which are sandwiched and held, have center holes, intensive pressurization at the edges of the center holes of the master information carrier and the slave medium, i.e. the edges of the inner peripheries is prevented and no damage is caused to edges of outside peripheries of the master information carrier and the slave medium, on the condition that a circular front surface of the elastic body has a center hole, and a diameter d1 of the center hole is larger than a diameter d2, which is the larger one of a diameter of the center hole of the foregoing master information carrier and a diameter of the center hole of the foregoing slave medium. Further, since the master information carrier and the like do not bite into the inner periphery of the elastic body, no damage is caused to the elastic body.

Further, when a difference between the outer diameter D1 and the outer diameter D2 and/or a difference between the diameter d1 and the diameter d2 is set between 0.2 mm and 4 mm, inclusive, the elastic body can be arranged so that the elastic body does not protrude from the master information carrier, and a uniform pressure can be applied over the entire contact area of the master information carrier and the slave medium which are superimposed. Therefore, both the master information carrier and the slave medium can be surely contacted over the entire contact area, excellent signal transfer can be performed, and excellent signal quality level can be obtained in the slave medium after transfer.

Further, when the outer diameter D1 is larger than the outer diameter D3 of the pattern area of the master information carrier, and/or the diameter d1 is smaller than the inner diameter d3 of the pattern area of the master information carrier, a uniform pressure can be applied in the pattern areas of the master information carrier and the slave medium. Therefore, excellent signal transfer can be performed, and excellent signal quality level can be obtained in the slave medium after transfer.

When the thickness of the elastic body is between 0.1 mm and 3 mm, generation of local low pressure portions in the vicinity of the edges of the inner and outer peripheries can be inhibited. When the thickness of the elastic body is too thick, local low pressure portions are generated in the vicinity of the edges of the inner and outer peripheries. When the thickness of the elastic body is too thin, the amount of deformation necessary to absorb holder flatness and unevenness in the thicknesses of the master, the slave, and the elastic body cannot be obtained.

When a degree of elasticity of the elastic body is from 0.5 MPa to 200 MPa, stress distribution from the inner periphery side to the outer periphery side can be averaged effectively, furthermore, pressure can be uniformized. When a degree of elasticity of the elastic body is higher than 200 MPa, pressure in the vicinity of the inner and outer peripheries may be higher than that in a central portion. In addition, when a degree of elasticity of the elastic body is lower than 0.5 MPa, accurate positioning becomes difficult. This is because the master information carrier would move due to easy deformation of the elastic body even when the master information carrier is fixed. This is not preferable since it causes core shift of the signals to be transferred. Further, a material having a low elastic modulus such as foamed rubber generally tends to generate dust. In this case, therefore, dust may be interposed between the master information carrier and the slave medium during contact thereof, causing signal drop-out.

The magnetic transfer device of the present invention uses the foregoing magnetic transfer holder of the present invention, and performs magnetic transfer in a state in which pressure is applied onto two sides of the foregoing contact body. Therefore, magnetic transfer can be performed while applying uniform pressure over the entire contact area, and excellent signal quality level can be obtained.

Damage, deformation and the like due to pressure application onto the master information carrier and the slave medium can be inhibited by setting a maximum value of pressure applied onto each portion of the pattern area to 2 MPa or less.

DESCRIPTION OF THE PREFERRED EMBODIMENTS

Figure 1:
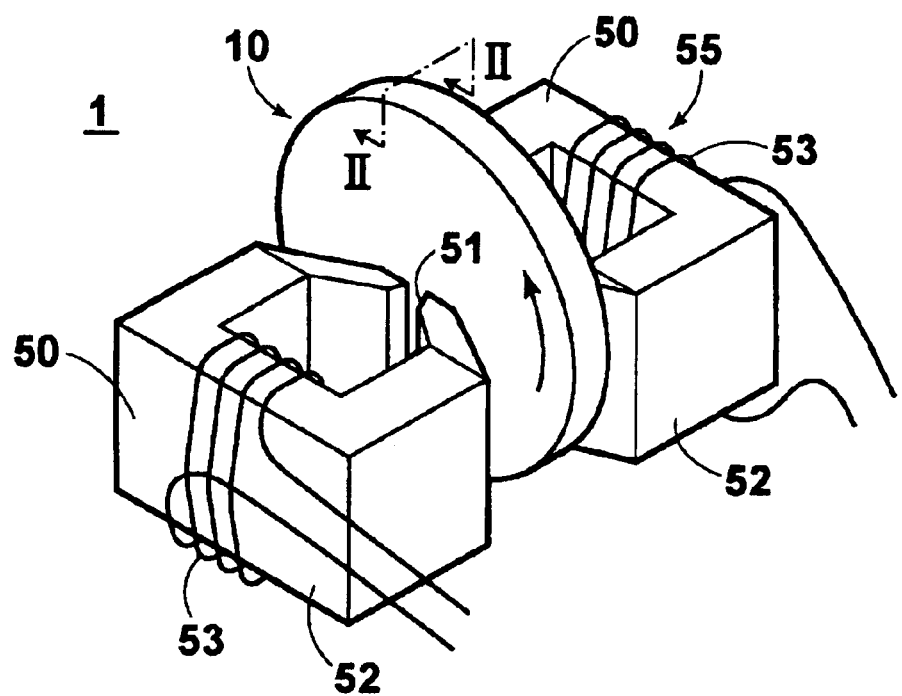
FIG. 1 is a perspective view showing the schematic construction of a magnetic transfer device according to an embodiment of the present invention.

The present invention will be described hereinbelow in detail based on embodiments shown in the drawings.

Figure 2:
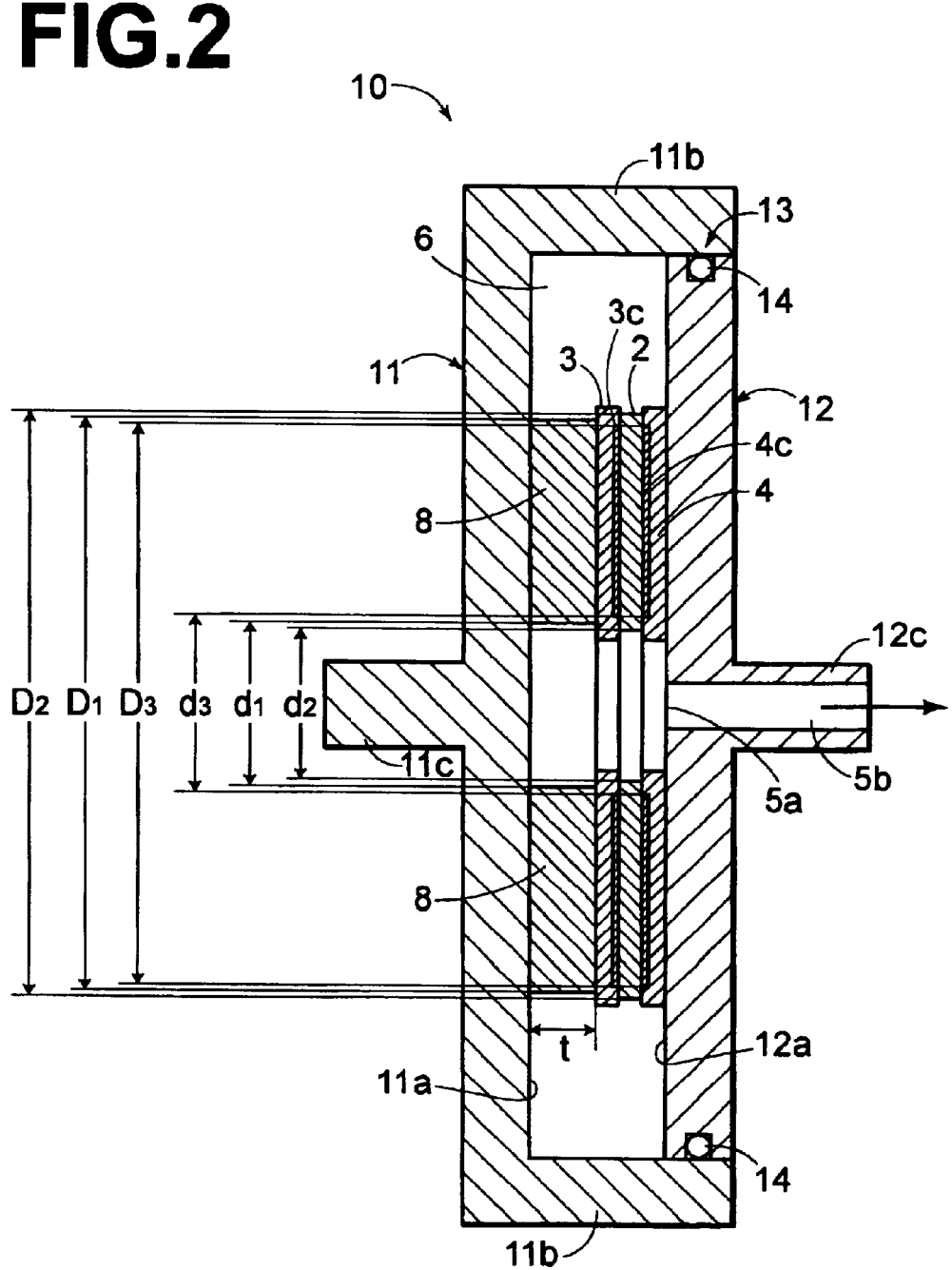
FIG. 2 is a cross sectional view taken along II—II in FIG. 1.
Figure 3:
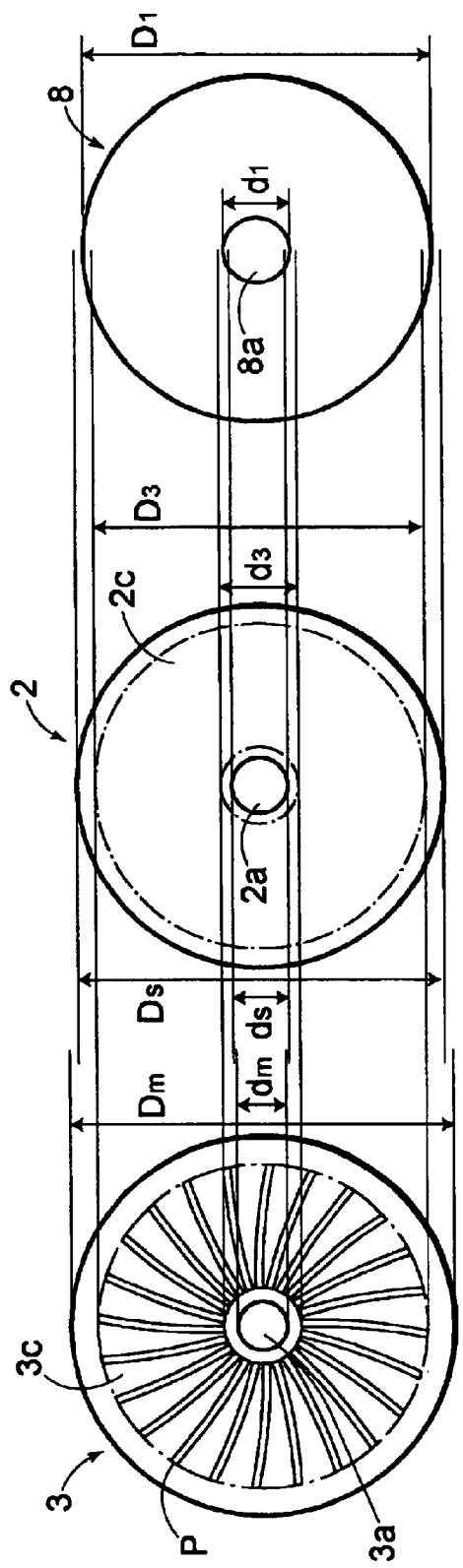
FIG. 3 is a plan view showing a master information carrier, a slave medium, and an elastic body.

FIG. 1 is a perspective view showing the schematic construction of a magnetic transfer device having a magnetic transfer holder of the present invention. FIG. 2 is a cross sectional view taken along line II—II of the magnetic transfer holder shown in FIG. 1. FIG. 3 is a plan view of a master information carrier and a slave medium which are held by the magnetic transfer holder, and an elastic body of the magnetic transfer holder. The figures are model diagrams, and dimensions of respective portions are shown at ratios different from the actual ratios.

A magnetic transfer device 1 comprises a magnetic transfer holder 10 which contacts and holds the master information carrier and the slave medium, a vacuum means not shown in the figure, which obtains contact force by vacuuming air in an interior space of the magnetic transfer holder 10 to depressurize the interior space, and a magnetic field application means 55 which applies transfer magnetic field while rotating the magnetic transfer holder 10.

The magnetic field application means 55 comprises electromagnet devices 50 arranged on both sides of the magnetic transfer holder 10. In this electromagnet device 50, a core 52 which has a gap 51 extending in a direction of the radius of the magnetic transfer holder 10 is wound by a coil 53. The direction of magnetic field lines generated in the gap 51 is parallel to the track direction of a slave medium 2 held by the magnetic transfer holder 10 (tangential direction of the circumferential track). Alternatively, the magnetic field application means 55 may comprise a permanent magnet device instead of the electromagnet device. The foregoing magnetic field application means 55 is intended for in-plane recording. However, in the case of vertical recording, the magnetic field application means may comprise electromagnets or permanent magnets having different polarities, which are arranged on both sides of the magnetic transfer holder 10. That is, in the case of vertical recording, transfer magnetic fields are applied in a direction perpendicular to the track surface.

Further, the magnetic field application means 55 is constructed so that the electromagnet devices 50 on both sides move approach and separate from each other to enable opening and closing movements of the magnetic transfer holder 10. Alternatively, the magnetic field application means 55 is constructed so that the electromagnet devices 50 or the holder 10 moves to enable insertion of the magnetic transfer holder 10 between the electromagnet devices 50.

As shown in FIG. 2, the magnetic transfer holder 10 comprises a first holder 11 on the left side and a second holder 12 on the right side, which are able to move relatively so as to approach and separate from each other. The magnetic transfer holder 10 houses the slave medium 2 and master information carriers 3 and 4 on both sides of the slave medium 2 in an interior space 6 hermetically closed by a seal mechanism 13 at the outer periphery after the first holder 11 and the second holder 12 approach each other. The magnetic transfer holder 10 sandwiches and holds a contact body wherein the slave medium 2 and the master information carriers 3 and 4 are superimposed and in close contact, in a state in which the center positions thereof are aligned, by depressurizing this interior space 6.

A pressing interior surface 11a of the first holder 11 holds one master information carrier 3 which transfers information such as servo signals to a single side of the slave medium 2, and the slave medium 2 via an elastic body 8 described later. A pressing interior surface 12a of the second holder 12 holds the other master information carrier 4 which transfers information such as servo signals to the other side of the slave medium 2.

That is, the first holder 11 of the magnetic transfer holder 10 is discoid, has the circular interior surface 11a which has a larger outer diameter than those of the master information carriers 3 and 4, holds a rear surface of the first master information carrier 3 in the central portion of this interior surface 11a by suction or the like, and holds the slave medium 2 on the front surface of this master information carrier 3 by suction or the like. The second holder 12 is discoid, similarly has the circular interior surface 12a which has a larger outer diameter than those of the master information carriers 3 and 4, and holds a rear surface of the second master information carrier 4 in the central portion of this interior surface 6a by suction or the like.

The seal mechanism 13 which connects the first holder 11 to the second holder 12 comprises a collar portion 11b protruding in an axial direction at the outer periphery of the first holder 11, and a seal material 14 comprising an O ring installed on the outer peripheral surface of the second holder 12. An outer diameter of the second holder 12 is smaller than a diameter of the first holder 11 at an inner peripheral surface of the collar portion 11b, so that the second holder 12 can be inserted into the inner periphery side of the collar portion 11b of the first holder 11. When the second holder 12 is moved toward the first holder 11, the seal material 14 on the outer peripheral surface of the second holder 12 slides and contacts the inner peripheral surface of the collar portion 11b of the first holder 11, and hermetically closes the interior space 6 while allowing relative movement.

Central axes 11c and 12c protrude from the central portions of rear surfaces of the first holder 11 and the second holder 12, respectively, and are supported by the magnetic transfer device body. The first holder 11 and the second holder 12 are linked to a rotation mechanism not shown in the figure, and they are driven and rotated integrally about the central axes 11c and 12c during magnetic transfer.

Further, in order to depressurize the interior space 6, a suction opening 5a which opens at the central portion of the pressing interior surface 12a of the second holder 12 is provided. An air path 5b, which communicates the suction opening 5a to the exterior outside through the central axis 12c of the second holder 12, is connected to a vacuum pump not shown in the figure.

The interior space 6 formed by the second holder 12 and the first holder 11 is depressurized to a predetermined vacuum level by vacuum suction with a vacuum pump. The slave medium 2 and the master information carriers 3 and 4 which are superimposed are pressurized thereby, and a predetermined contact pressure is obtained.

Further, the discoid elastic body 8 is arranged at the pressing interior surface 11a of the first holder 11, in the holder 10, and the first master information carrier 3 is held on this elastic body 8. When applying pressure involved in depressurization of the interior space 6, the elastic body 8 deforms itself to contact the master information carriers 3 and 4 against both sides of the slave medium 2 with a predetermined pressurization force.

FIG. 3 shows a plan view of the slave medium 2, the master information carrier 3, and the elastic body 8. As shown in FIG. 3, the master information carrier 3 is formed in the shape of plate having a center hole 3a, and a transfer pattern P is formed in a toroidal pattern area, excluding an inner peripheral portion and an outer peripheral portion on a single side (information bearing side). A diameter of the center hole 3a of the master information carrier 3 is dm, an outer diameter of the master information carrier 3 is Dm, an inner diameter of the pattern area of the front surface of the master information carrier 3 is d3, and an outer diameter of the pattern area of the front surface of the master information carrier 3 is D3. The master information carrier 4 has substantially the same shape as that of the master information carrier, and has a transfer pattern to be transferred to the other side of the slave medium 2.

The transfer pattern P shown in the figure is in the case where transfer information is servo signals. This pattern P is composed by forming a servo pattern on narrow areas (servo areas) radiating in substantially all directions at equal intervals from the central portion of the master information carrier. The servo areas are not only formed in a continuously curved radial pattern in a radius direction as shown in the figure, but also may be formed in a linear radial pattern. Here, descriptions are made regarding a case where transfer information is servo signal. However, a transfer pattern is not limited to the servo pattern, and can be a pattern including various data.

As a substrate for the master information carrier 3, nickel, silicon, quartz plate, glass, aluminum, an alloy, ceramics, a synthetic resin or the like is used. The uneven pattern is formed by stamper method and the like. A magnetic body is formed by depositing a magnetic material by using vacuum deposition means such as a vacuum deposition method, a sputtering method, an ion plating method, an electroplating method, or the like. Substantially the same master information carriers are used for in-plane recording and vertical recording.

As the slave medium 2, a discoid magnetic recording medium wherein a magnetic recording portion (magnetic layer) is formed on both sides, such as a hard disk or a high-density flexible disk is used. The magnetic recording portion comprises a coating type magnetic recording layer, or a metal thin film type magnetic recording layer. The slave medium 2 shown in the figure is discoid, with a center hole 2a. A toroidal area shown by dashed lines excluding an inner periphery portion and an outer periphery portion is set to be a recording area 2c for performing recording/reproduction and becomes a head motion space. The foregoing transfer pattern P is contacted with this recording area 2c, and corresponding magnetization pattern is transferred and recorded. A diameter of the center hole 2a of the slave medium 2 is ds, and an outer diameter of the slave medium 2 is Ds. Further, the recording area 2c has substantially the same shape as that of the pattern area of the master information carrier 3, and its inner diameter is d3, and its outer diameter is D3. A difference between the outer diameter Ds of the slave medium 2 and the outer diameter D3 of the recording area 2c is generally about 2 mm, and a difference between the diameter ds and the inner diameter d3 is about 7 mm.

The elastic body 8 is discoid with a center hole 8a, and a diameter of the center hole 8a is d1, and an outer diameter of the elastic body 8 is D1. The outer diameter D1 is smaller than an outer diameter D2, which is the smaller one of the outer diameter Dm of the master information carrier 3 and the outer diameter Ds of the slave medium 2. The outer diameter D1 is larger than the outer diameter D3 of the recording area 2c. A diameter of the center hole 8a is larger than d2, which is the larger one of the diameter dm of the center hole of the master information carrier 3 and the diameter ds of the center hole of the slave medium 2. The diameter of the center hole 8a is smaller than the inner diameter d3 of the recording area 2c. In this embodiment, since the outer diameter Ds of the slave medium 2 is smaller than the outer diameter Dm of the master information carrier 3, the outer diameter Ds of the slave medium 2 is D2, and since the diameter ds of the center hole of the slave medium is larger than the diameter dm of the center hole of the master information carrier, the diameter ds of the center hole of the slave medium is d2. It is desirable that a difference between the outer diameter D1 and the outer diameter D2 is between 0.2 mm and 4 mm, inclusive, and a difference between the outer diameter D1 and the outer diameter D3 is 4 mm or less. Similarly, it is desirable that a difference between the diameter d1 and the diameter d2 is between 0.2 mm and 4 mm, inclusive, and a difference between the diameter d1 and the inner diameter d3 is 4 mm or less. When a difference between the outer diameter D1 and the outer diameter D2 and a difference between the diameter d1 and the diameter d2 are respectively below 0.2 mm, i.e. the differences between respective radii of both are below 0.1 mm, it is difficult to precisely arrange the elastic body so that the elastic body does not protrude from the master carrier. In this embodiment, the master information carriers 3 and 4 on both sides have substantially the same shape. However, respective diameters of the two master carriers are not necessarily identical. When the master information carrier 3 and the master information carrier 4 have different outer diameters and center hole diameters from each other, the smaller outer diameter of the outer diameters of the master information carriers 3 and 4, and the larger center hole diameter of their center hole diameters can be regarded as the outer diameter Dm and the center hole diameter dm of the master information carrier.

The magnetic transfer holder 10 of the present invention presses and contacts the slave medium 2 and the master information carriers 3 and 4 via the elastic body 8. The outer diameter D1 and the center hole diameter d1 of the elastic body 8 have relationships of D3<D1<D2 and d3<d1<d2 as mentioned above. Therefore, local high pressure is never applied onto the inside and outside rims of the contact body comprising the master information carriers 3 and 4 and the slave medium 2, and damage is not caused to the edges of the master information carriers 3 and 4 and the slave medium 2. Further, uniform pressure is applied onto the pattern area, and contact can be made uniformly over the entire contact area. Therefore, a magnetization pattern accurately corresponding to the transfer pattern formed on the master information carriers 3 and 4 can be transferred and recorded onto the slave medium 2. Furthermore, when the outer diameters and the center hole diameters have the foregoing relationships, the edges of the master information carriers 3 and 4 never bite into the elastic body 8, so that damages to the elastic body can be prevented.

Specific materials for the foregoing elastic body 8 include fluorine rubber, urethane rubber, nitrile rubber, ethylene propylene rubber, silicon rubber, neoprene rubber, viton rubber, butadiene rubber, natural rubber and the like.

When the thickness t of the elastic body 8 is too thick, a local low pressure portion is generated in the vicinity of the edges of the inner and outer diameters. However, it was clarified from investigations by the inventors of the present invention et al., that by setting the thickness t of the elastic body 8 to 0.1 mm to 3 mm, generation of the local low pressure portion in the vicinity of the edges of the inside and outer diameters of the slave medium could be inhibited. In order to inhibit generation of the low pressure portion, it is preferable that the thickness t is thinner. However, in order to obtain the amount of deformation which absorbs flatness of the holders 11 and 12 and unevenness of thickness of the masters 3 and 4, the slave medium 2, and the elastic body 8 itself, it is preferable that the thickness t is 0.5 mm or more. Therefore, the thickness t is preferably between 0.1 mm and 3 mm, and is more preferably between 0.5 mm and 3 mm.

Further, when a elastic modulus is too low, the master information carrier moves due to easy deformation of the elastic body even if the master information carrier is fixed, so that accurate positioning becomes difficult. This is not preferable since it causes core shift of the signals to be transferred. Therefore, it is preferable that the elastic modulus is from 0.5 MPa to 200 MPa.

Next, a description will be given regarding a method for magnetic transfer by the foregoing magnetic transfer device.

When performing magnetic transfer, initial DC magnetization is performed on the slave medium 2 in advance, in an in-plane track direction for in-plane recording and in a vertical direction for vertical recording. Magnetic transfer is performed by contacting this slave medium 2 with the master information carriers 3 and 4, and applying a transfer magnetic field in approximately an opposite track direction of the initial DC magnetization direction, or in a vertical direction.

In the case of the in-plane recording, a transfer magnetic field, which is generated in parallel to the track direction, is applied by the magnetic field application means 55. In this regard, the transfer magnetic field is applied over the entire contact area of the slave medium 2 and the master information carriers 3 and 4 by rotating the magnetic transfer holder 10. Alternatively, it is possible that the magnetic field application means is rotated and moved.

The magnetic transfer holder 10 of the foregoing magnetic transfer device performs magnetic transfer to a plurality of slave mediums 2 from the same master information carriers 3 and 4. First, the master information carriers 3 and 4 are aligned with the first holder and the second holder 12, and held. Then, in a state in which the first holder 11 and the second holder 12 are separated, the slave medium 2, which has been initially magnetized in either an in-plane direction or a vertical direction in advance, is set with its center position aligned, and then the second holder 12 is moved toward the first holder 11.

Next, the seal material 14 of the second holder 12 slides and contacts the inner peripheral surface of the collar portion 11b of the first holder 11, and hermetically closes the interior space 6 of the magnetic transfer holder 10 housing the slave medium 2 and the master information carriers 3 and 4 therein. The slave medium 2 and the master information carriers 3 and 4, which are superimposed, are pressurized by performing depressurization with evacuation of air in the hermetically closed space by the vacuum suction means 5, obtaining a predetermined degree of vacuum inside, and relatively moving the second holder and the first holder 11. Consequently, the second holder 12 adds contact force to the slave medium 2 and the master information carrier 3 toward the first holder 11 and contacts them with a predetermined contact pressure by pressure due to external force (atmospheric pressure) which acts corresponding to a degree of vacuum. In addition, evacuation is performed at the contact face of both, so that the contact properties therebetween is improved.

Then, variation of pressure applied onto each portion of the pattern area is set so that a maximum pressure $P_{max}$ is twice or less than a minimum pressure $P_{min}$, and a maximum value of pressure applied onto each portion of the pattern area is 2MPa (approximately 20 kgf/cm$^2$) or less. By providing the elastic body 8 described above, the maximum pressure $P_{max}$ can be twice or less than the minimum pressure $P_{min}$, and pressure applied onto each portion of the pattern area can be uniformized.

Thereafter, the magnetic field application means 55 is caused to approach to both sides of the magnetic transfer holder 10, a transfer magnetic field is applied in approximately opposite direction of the initial magnetization direction by the magnetic field application means while rotating the magnetic transfer holder 10, and a magnetization pattern corresponding to the transfer pattern of the master information carriers 3 and 4 is transferred and recorded onto the recording area of the slave medium 2.

The transfer magnetic field applied in the foregoing magnetic transfer is absorbed into the convex portions of the pattern of the magnetic body contacted with the slave medium 2 in the transfer pattern of the master information carriers 3 and 4. In the case of in-plane recording, the initial magnetization is not inverted in these portions, and is inverted in other portions. In the case of vertical recording, the initial magnetization is inverted in these portions, and not inverted in other portions. Consequently, the magnetization pattern corresponding to the transfer pattern of the master information carriers 3 and 4 is transferred to and recorded on the slave medium 2.

Further, it is possible to use mechanical pressurization by an exterior source of power on the holder 10 in combination with pressurization by depressurization of the interior space 6 of the foregoing magnetic transfer holder 10. This mechanical pressure means can be constructed, for example, by providing a pressure cylinder, and having a pressure rod end of the pressure cylinder apply a predetermined pressure load to the central axis 11c or the central axis 12c of the holder 10.

FIGS. 4 to 9 are cross sectional views of the magnetic transfer holder 10 which respectively show other embodiments. In these embodiments, the sizes of outer diameters and center hole diameters of the slave medium 2, the master information carriers 3 and 4, an outer diameter, a center hole diameter, and a shape of the elastic body 8 are different from the foregoing embodiment. In FIGS. 4 to 9, the same symbols are applied to the same constituent parts as those in the embodiment of FIG. 2, and detailed descriptions thereof will be omitted.

Figure 4:
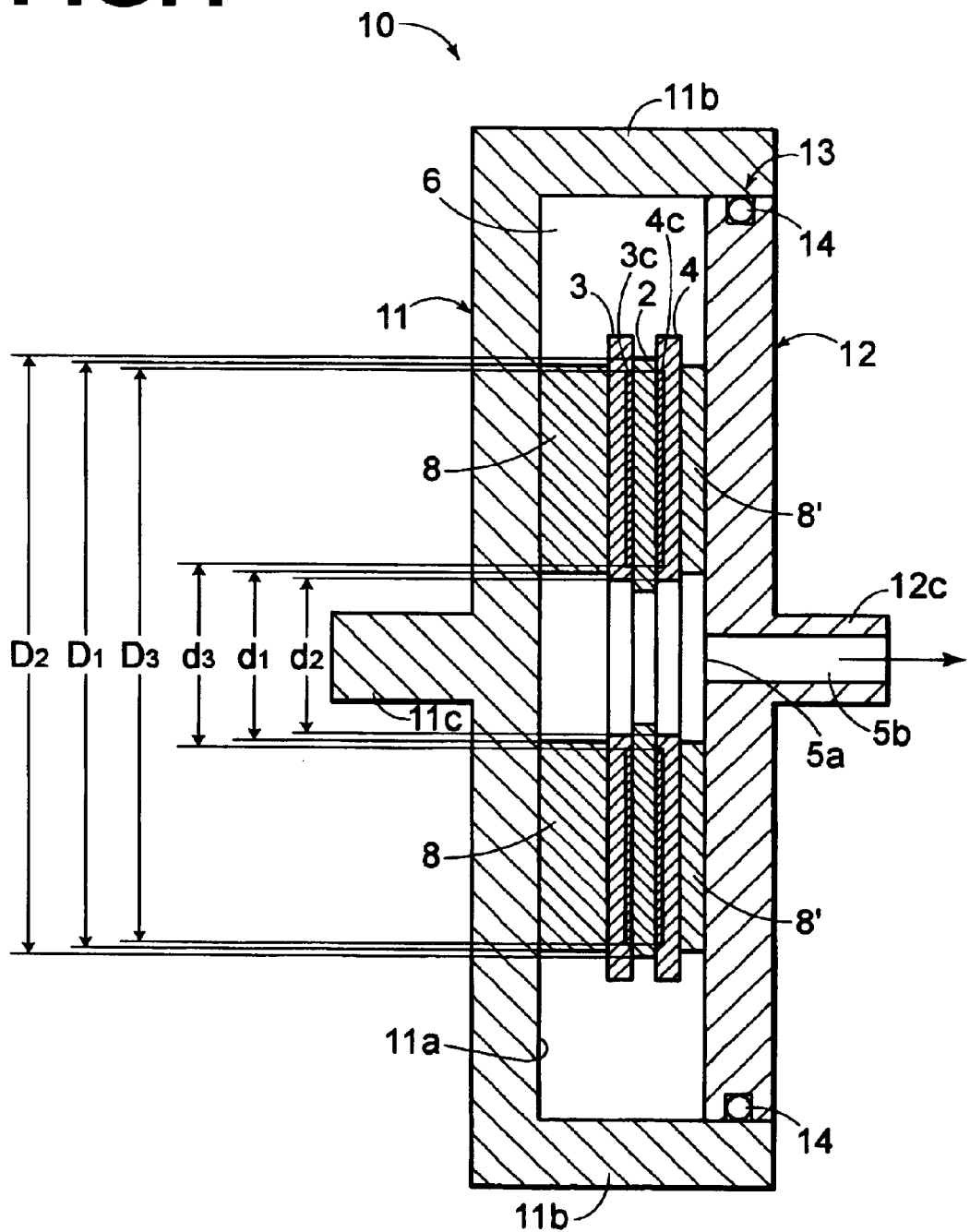
FIG. 4 is a schematic cross sectional view of a magnetic transfer holder according to a second embodiment of the present invention.

In a magnetic transfer holder of a second embodiment shown in FIG. 4, an elastic body 8' is also arranged on the side of the second holder 12. That is, the magnetic transfer holder 10 of this embodiment sandwiches and holds the contact body comprising the master information carriers 3 and 4 and the slave medium 2 via the elastic bodies 8 and 8' arranged on both sides of the contact body. Further, in the contact body of the magnetic transfer holder, as shown in the figure, outer diameters and center hole diameters of the master information carriers 3 and 4 are identical, an outer diameter of the slave medium 2 is smaller than the outer diameters of the master information carriers 3 and 4, and center hole diameters of the master information carriers 3 and 4 are larger than a center hole diameter of the slave medium 2. Therefore, in this embodiment, the outer diameter of the slave medium 2 is D2, and the center hole diameter of the master information carrier is d2. Further, outer diameters and inner diameters of the pattern areas 3c and 4c of the master information carriers 3 and 4 are D3 and d3, respectively.

The thickness of the elastic body 8 is larger than that of the elastic body 8', but the outer diameters D1 and center hole diameters d1 thereof are identical. Sizes of outer diameters and center hole diameters satisfy relationships of D2<D1<D3 and d2<d1<d3. Since the elastic bodies 8 and 8' satisfying these relationships are provided, in the magnetic transfer holder of this embodiment, effects similar to those in the foregoing first embodiment can be obtained. Further, the thicknesses of the elastic body 8 and 8' are respectively in the range of 0.1 mm to 3 mm, for example, the thickness of the elastic body 8 is 3 mm, and the thickness of the elastic body 8' is 0.5 mm. By tightly holding the two sides of the contact body via the elastic bodies, it is possible to uniformize the pressure applied at each portion, and magnetic transfer with even better signal quality level can be performed than in the case wherein the elastic body is provided only on one side.

Figure 5:
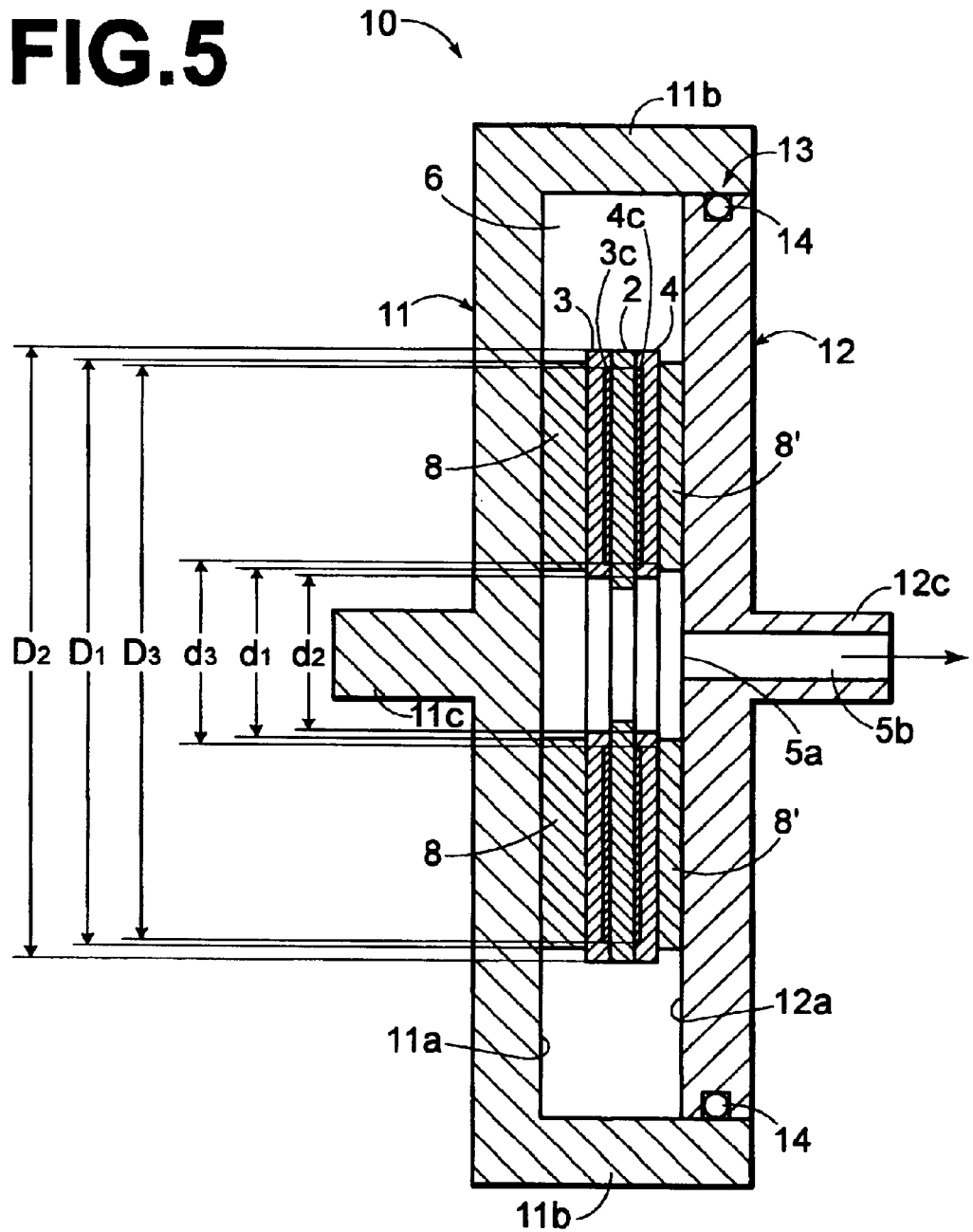
FIG. 5 is a schematic cross sectional view of a magnetic transfer holder according to a third embodiment of the present invention.

In a magnetic transfer holder of a third embodiment shown in FIG. 5, the elastic bodies 8 and 8' are respectively arranged on the first holder 11 and the second holder 12 in a manner similar to in the second embodiment. Further, in this embodiment, as shown in the figure, the outer diameters D2 of the master information carriers 3 and 4 and the slave medium 2 are identical, and center hole diameters of the master information carriers 3 and 4 are larger than a center hole diameter of the slave medium 2. Therefore, in this embodiment, the center hole diameters of the master information carriers 3 and 4 are d2. Further, the outer diameters and the inner diameters of the pattern areas 3c and 4c of the master information carriers 3 and 4 are respectively D3 and d3. Thicknesses, outer diameters D1, and center hole diameters d1 of the elastic bodies 8 and 8' are substantially identical. Sizes of the outer diameters and center hole diameters satisfy relationships of D2<D1<D3, and d2<d1<d3. Since the elastic bodies 8 and 8' which satisfy these relationships are provided, effects similar to in the case of the foregoing first embodiment can be obtained in the magnetic transfer holder of this embodiment.

Further, in this embodiment, thicknesses of the elastic bodies 8 and 8' are substantially identical and thin, i.e. about 0.5 mm. By setting the thicknesses of the both elastic bodies 8 and 8' to about 0.5 mm, pressure can be uniformized more than in the second embodiment.

Figure 6:
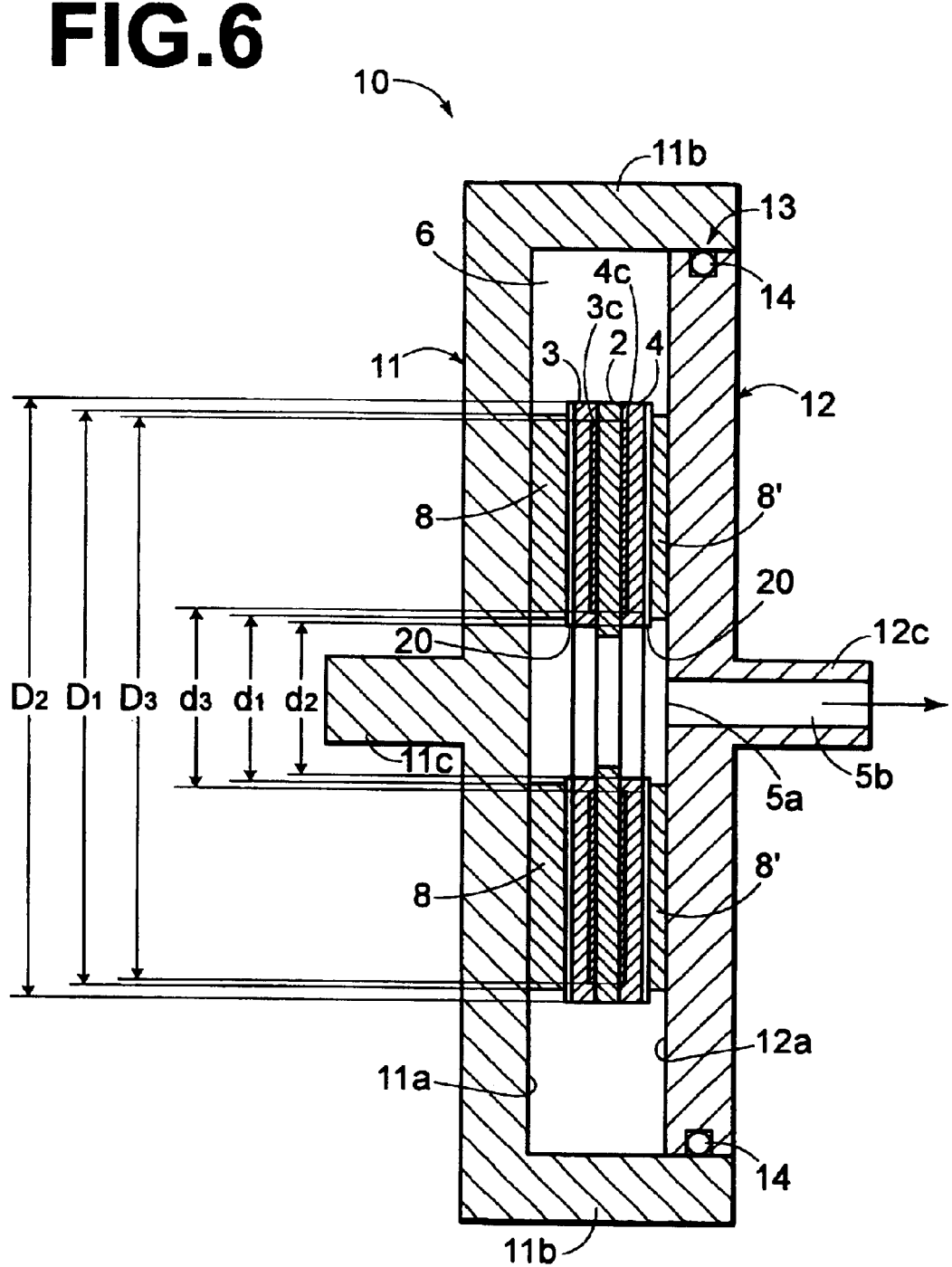
FIG. 6 is a schematic cross sectional view of a magnetic transfer holder according to a fourth embodiment of the present invention.

A magnetic transfer holder of a fourth embodiment shown in FIG. 6 is the same as the magnetic transfer holder of the third embodiment, except that a rigid plate 20 is provided between the master information carrier and the elastic body. This rigid plate 20 is a board in the same shape as that of the master information carriers 3 and 4, and provided in order to hold the master information carriers 3 and 4 and/or to secure rigidity of the master information carriers 3 and 4. When the rigid plates 20 are provided between the elastic bodies 8, 8' and the master information carriers 3, 4 in this manner, effects similar to the foregoing effects can be obtained as well.

Figure 7:
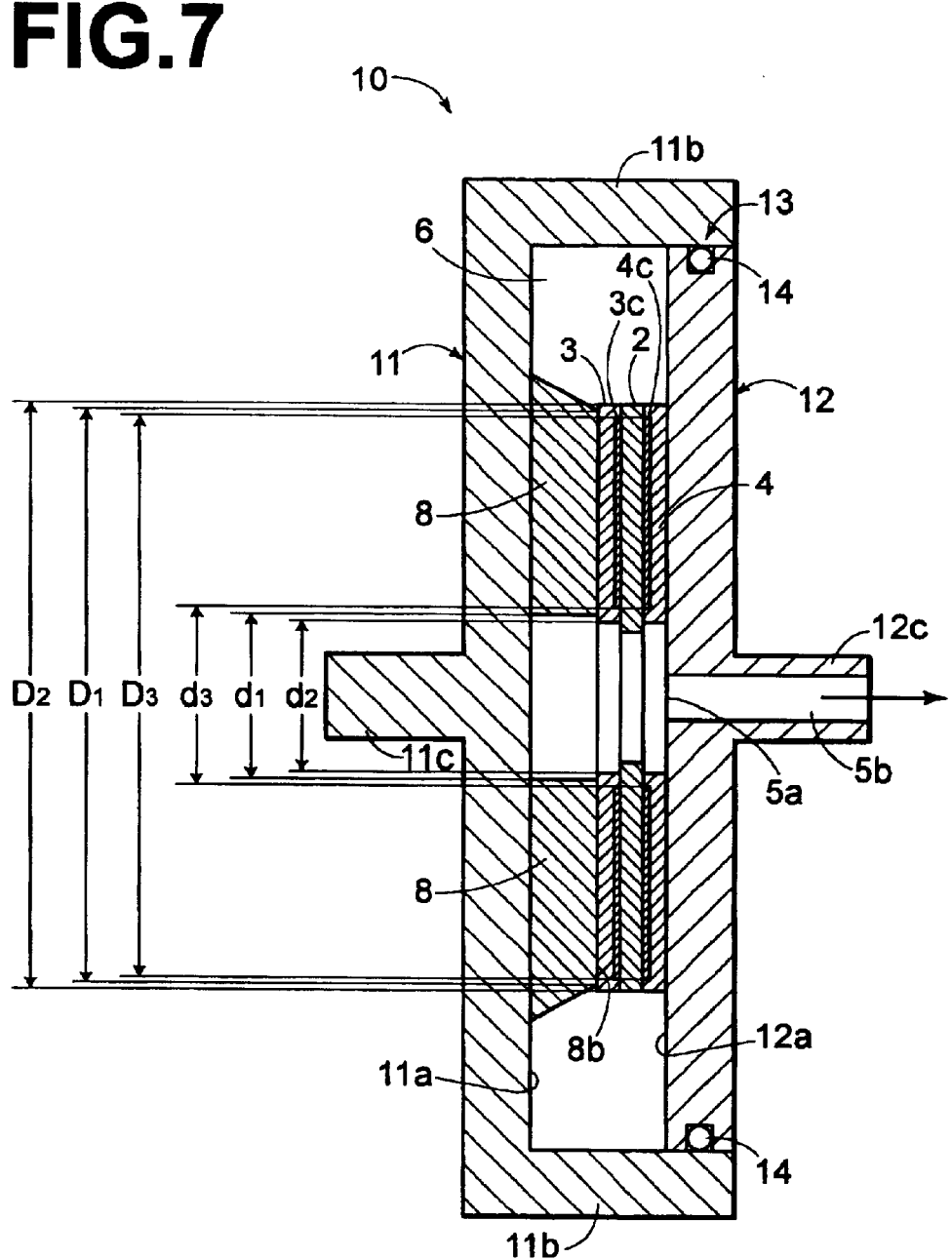
FIG. 7 is a schematic cross sectional view of a magnetic transfer holder according to a fifth embodiment of the present invention.

A magnetic transfer holder of a fifth embodiment shown in FIG. 7 is the same as in the foregoing other embodiments, except that the elastic body 8 is not discoid, but conical. The center hole 8a is provided in the center of the cone, and its base is arranged to face the holder 11 side, and its top face is arranged to face the master information carrier 3. An outer diameter of the top face of the circular cone, i.e. a front surface 8b of the elastic body on the side facing at least the contact body is D1, and a diameter of the center hole 8a is d1. The center hole 8a does not necessarily penetrate through the elastic body, and can be a shape wherein a hole is provided on the front surface 8b that faces the master information carrier 3. Further, regarding the front surface 8b of the elastic body 8 on the side that faces the master information carrier 3, its outer diameter D1 and its center hole diameter d1 satisfy relationships of D2<D1<D3 and d2<d1<d3 with outer diameters D2 and D3 and a center hole diameter d2 and an inner diameter d3 of the master information carriers 3 and 4 or the slave medium 2, and the pattern area.

When the front surface 8b facing the master information carrier 3 is circular and its outer diameter and its center hole diameter satisfy the foregoing relationships, effects similar to those of the foregoing first embodiment can be obtained, even if the elastic body 8 is not discoid.

Figure 8:
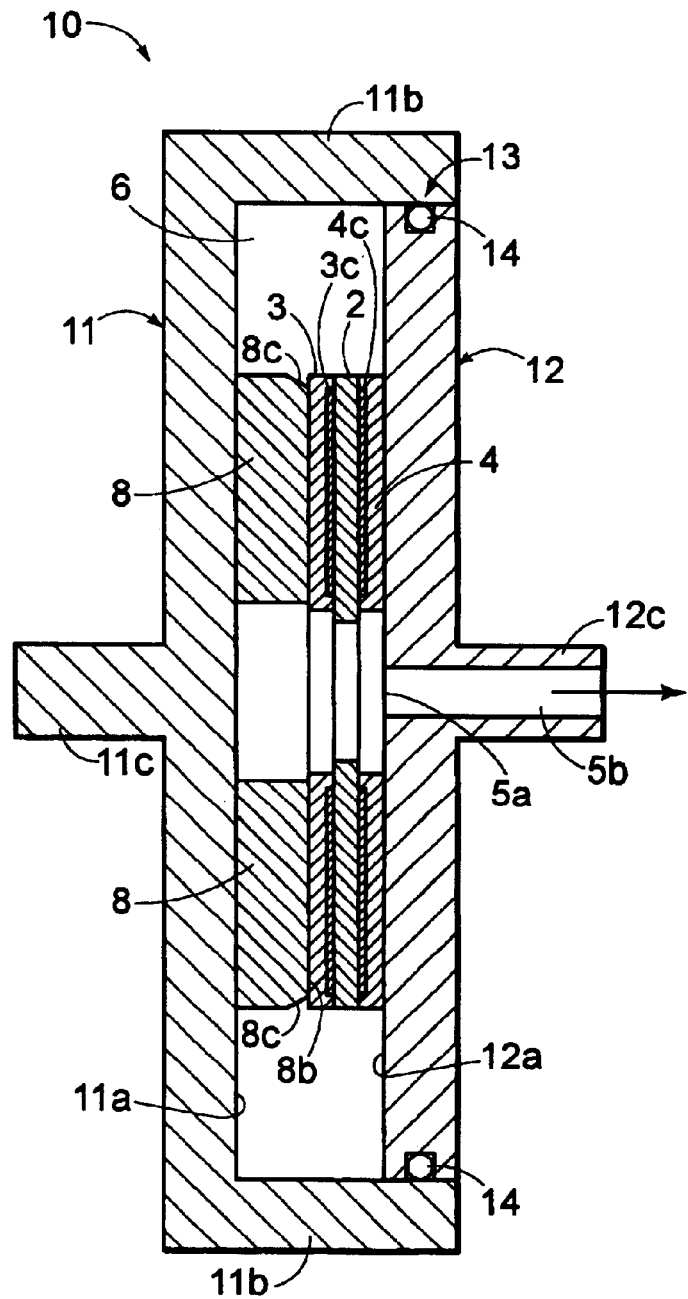
FIG. 8 is a schematic cross sectional view of a magnetic transfer holder according to a sixth embodiment of the present invention.

A magnetic transfer holder of a sixth embodiment shown in FIG. 8 is the same as the other embodiments, except that an outside rim 8*c* on the front surface 8*b* side facing the master information carrier 3 is chamfered, although the elastic body 8 is discoid. The outside rim 8*c* of the elastic body 8 is chamfered, and its front surface 8*b* is circular having an outer diameter of D1 and a diameter of the center hole 8*a* of d1. Regarding the front surface 8*b*, its outer diameter D1 and its center hole diameter d1 satisfy relationships of D2<D1<D3 and d2<d1<d3 with outer diameters D2 and D3, a center hole diameter d2, and an inner diameter d3 of the master information carriers 3 and 4 or the slave medium 2, and the pattern area.

When the shape of the front surface 8*b* of the elastic body 8 on the side facing the master information carrier 3 satisfies the foregoing relationships, effects similar to those in the foregoing first embodiment can be obtained, even if the shape of the surface of the elastic body 8 on the side of the holder 11*b* does not satisfy the foregoing outer diameter and center hole diameter relationship.

Figure 9:
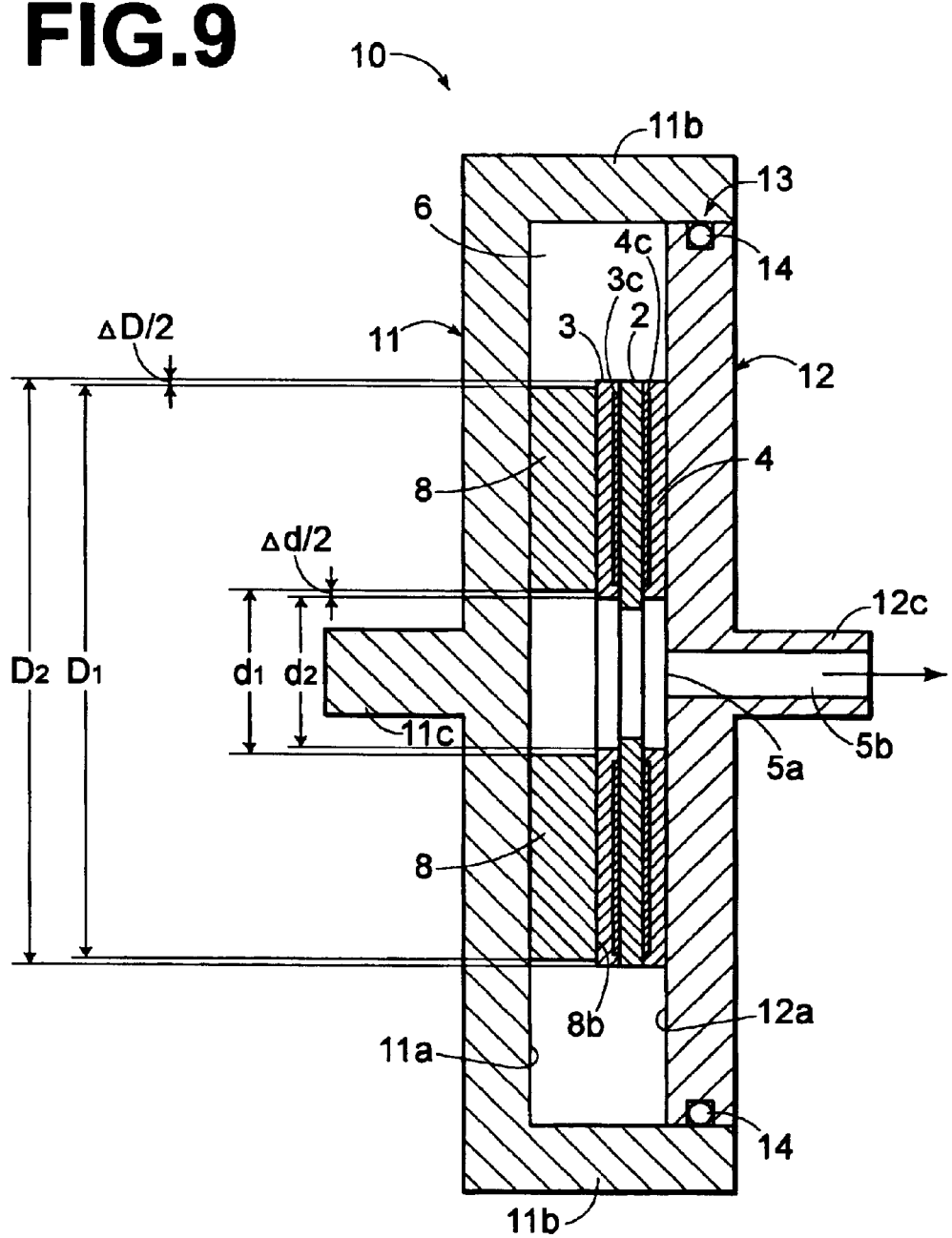
FIG. 9 is a schematic cross sectional view of a magnetic transfer holder according to a seventh embodiment of the present invention.

In a magnetic transfer holder of a seventh embodiment shown in FIG. 9, a center hole diameter d1 of the elastic body 8 is larger than the maximum diameter d2 among center hole diameters of the slave medium 2 and the master information carriers 3 and 4, and an outer diameter D1 is smaller than an outer diameter D2 of the slave medium 2 and the master information carriers 3 and 4. Both a difference ΔD between D1 and D2 and a difference Δd between d1 and d2 are in the range of 0.2 mm to 4 mm. Radius differences ΔD/2 and Δd/2 shown in the figure are in the range of 0.1 mm to 2 mm. It is possible thereby that high pressure applied to the edges of the inner and outer peripheries of the slave medium 2 and the master information carriers 3 and 4 is prevented, and damage to the inner periphery end and the outer periphery end can be prevented. It is desirable that the outer diameter D1 is larger than the outer diameters of the pattern areas 3*c* and 4*c*, and the center hole diameter d1 is smaller than the inner diameters of the pattern areas 3*c* and 4*c*. However, even when the outer diameter D1 is equal to or smaller than those of the pattern areas 3*c* and 4*c*, or even when the center hole diameter d1 is equal to or larger than the inner diameters of the pattern areas 3*c* and 4*c*, substantially uniform pressure can be obtained over the pattern area.

When at least one of the center hole diameter and the outer diameter of the elastic body 8 satisfies the foregoing relationship with the center hole diameters or the outer diameters of the master information carrier and the slave medium, effects of damage protection can be obtained.

Figure 10:
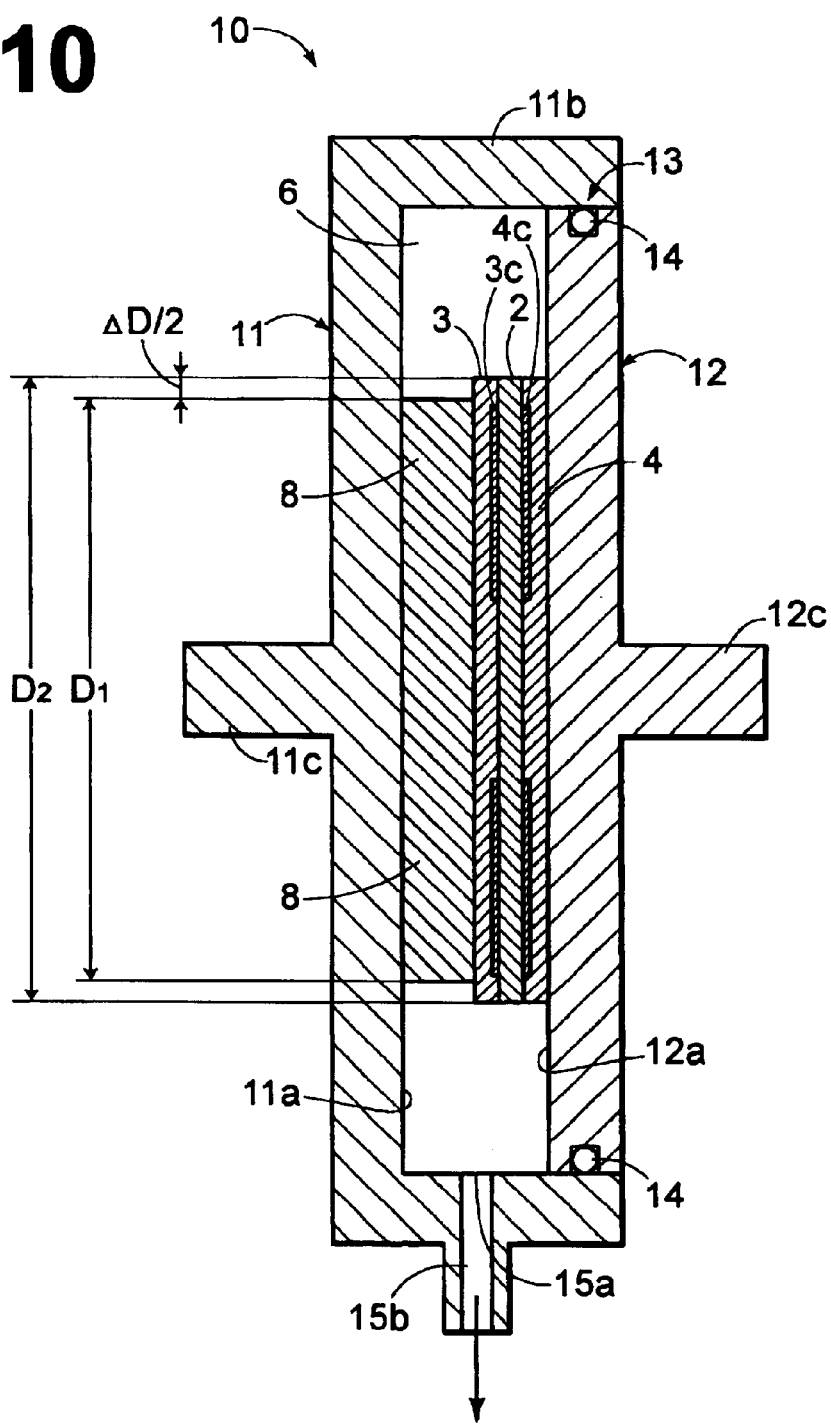
FIG. 10 is a schematic cross sectional view of a magnetic transfer holder according to an eighth embodiment of the present invention.

In a magnetic transfer holder of a eighth embodiment shown in FIG. 10, there is no center hole in the elastic body 8, and the slave medium 2 and the master information carriers 3 and 4, which are sandwiched and held by this magnetic transfer holder, have no center holes. When the magnetic transfer holder sandwiches and holds the slave medium 2 and the master information carriers 3 and 4, which have no center holes in this manner, it is not necessary to provide a center hole in the elastic body 8. In order to hold the master information carriers and the slave medium which have no center holes, the magnetic transfer holder 10 has an outer peripheral positioning portion not shown in the figure. A suction opening 15*a* and an air path 15*b* to suction air in the holder interior space 6 are provided at a peripheral portion of the first holder 11*b*, and the air path 15*b* is connected to a vacuum pump not shown in the figure.

The outer diameters of the slave medium 2 and the master information carriers 3 and 4 are equal, and designated as D2. Further, an outer diameter D1 of the elastic body 8 is smaller than the outer diameter D2, and a difference ΔD between D1 and D2 is between 0.2 mm and 4 mm, inclusive, and a radius difference ΔD/2 shown in the figure is between 0.1 mm to 2 mm, inclusive.

Consequently, high pressure applied to the outer peripheral rims of the slave medium 2 and the master information carriers 3 and 4 is prevented, so that damage to the outer peripheral edges can be prevented. It is desirable that D1 is larger than the outer diameters of the pattern areas 3*c* and 4*c*. However, substantially uniform pressure can be obtained over the pattern area, even when D1 is equal to or smaller than the outer diameters of the pattern areas 3*c* and 4*c*.

In each of the foregoing embodiments, double sided simultaneous transfer, wherein the master information carriers 3 and 4 face and contact both sides of the slave medium 2 has been described. However, it is possible to perform single sided consecutive transfer wherein the master information carrier 3 or 4 faces and contacts one side of the slave medium 2.

EXAMPLE

A concrete example of the present invention and Comparative examples 1 and 2 will be described.

In each example, respective magnetic transfer holders comprise the first holder and the second holder of the first embodiment, and tightly hold two sides of a contact body via respective elastic bodies having a thickness of 0.5 mm.

Master information carriers and slave mediums which are sandwiched and held by the magnetic transfer holders in the Example and comparative examples are identical. The master information carriers, the slave mediums, an elastic body of the Example, an elastic body of Comparative example 1, and an elastic body of Comparative example 2 each have center holes, and their center hole diameters (inner diameters) d and outer diameters D are as shown in Table 1:

TABLE 1

|  | Inner diameter d (mm) | Outer diameter D (mm) |
| --- | --- | --- |
| Master information carrier | 29.0 | 84.0 |
| Slave medium | 25.0 | 84.0 |
| Elastic body of Example | 29.1 | 83.9 |
| Elastic body of Comparative example 1 | 29.0 | 84.0 |
| Elastic body of Comparative example 2 | 28.9 | 84.1 |

Figure 11A:
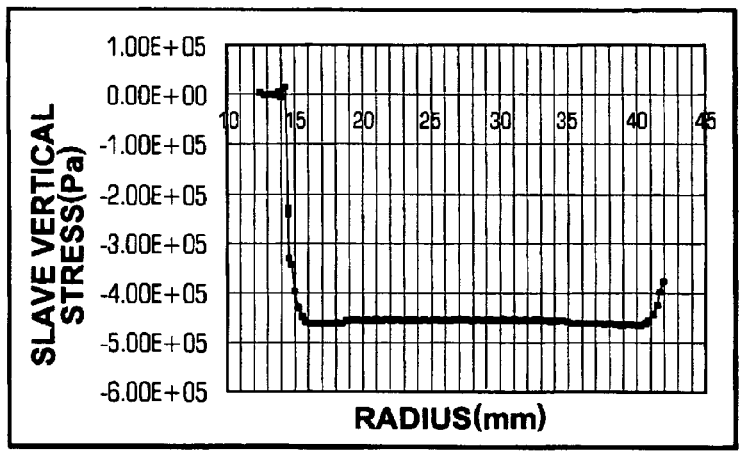
FIGS. 11A, 11B, and 11C are figures showing simulation results which show vertical stress distributions in the slave medium regarding an embodiment of the present invention and comparative examples.
Figure 11B:
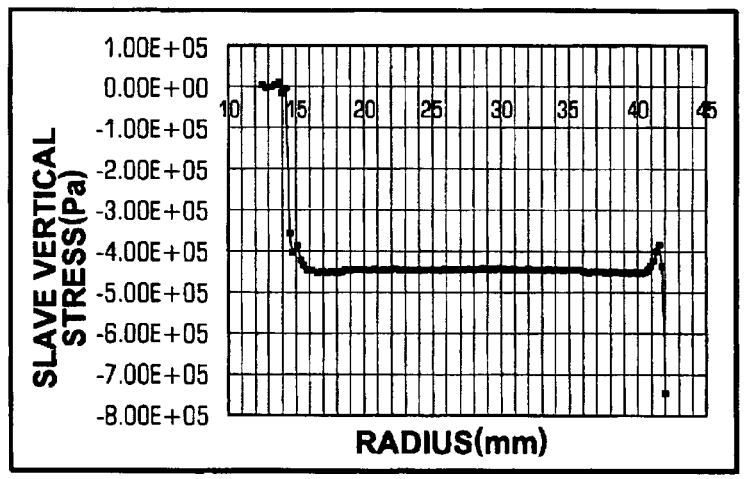
Figure 11C:
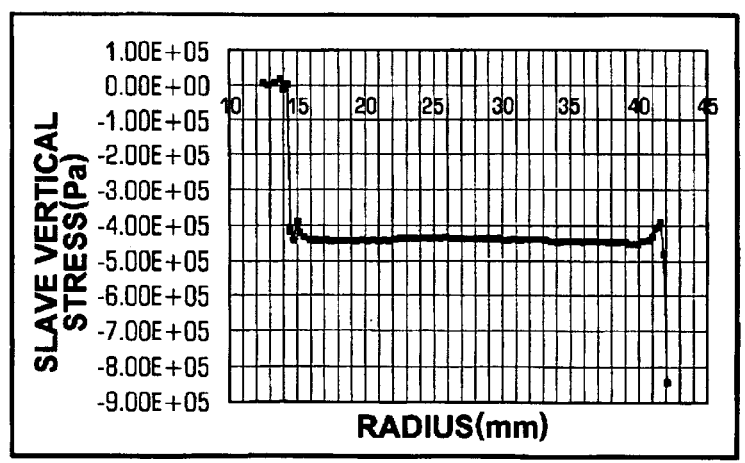

FIGS. 11A, 11B, and 11C show simulation results of vertical stress distribution in the slave medium when the master information carrier and the slave medium are sandwiched, held and contacted by the magnetic transfer holders of the Example and Comparative examples 1 and 2. FIGS. 11A, 11B, and 11C show vertical stress in one radius from an inner diameter to an outer diameter of the slave medium. FIG. 11A shows a result of the Example, FIG. 11B shows a result of Comparative example 1, and FIG. 11C shows a result of Comparative example 2. In Comparative examples 1 and 2, exponential increases in pressure was generated at the outer peripheral edges (stress is larger in a downward direction of the vertical axis), and pressure became discontinuous and some portions wherein pressure was low were generated at the inner periphery edges. When such a local high pressure is applied, damage to the slave medium or the master information carrier may be caused. Meanwhile, when there is a portion wherein pressure is reduced, the quality level of signal transfer may be deteriorated at that portion. On the other hand, in the Example, portions, at which localized high pressure was applied as seen in the comparative examples, were not generated.

That is, it is apparent that localized application of high pressure and damage to the slave medium and the master information carrier can be inhibited in the Example, wherein an outer diameter of the elastic body is smaller than an outer diameter of the slave medium or the master information carrier, than in the comparative examples, wherein an outer diameter of the elastic body is equal to or larger than an outer diameter of the slave medium or the master information carrier.

When the elastic body has an inner diameter which is equal to or smaller than inner diameters of the master information carrier and the slave medium, some places onto which local high pressure is applied may be generated on the inner diameter side similar to on the outer periphery side in FIG. 11B according to a degree of elasticity of the elastic body, the thickness of the elastic body and the like. However, localized application of high pressure could be inhibited by having an inner diameter of the elastic body being smaller than an inner diameter, which is the smaller one of those of the master information carrier and the slave medium.

What is claimed is:

1. A magnetic transfer holder which sandwiches and holds therein a contact body comprising a discoid master information carrier having a toroidal pattern area bearing transfer information on a front surface and a discoid slave medium receiving transfer of the foregoing transfer information from the master information carrier, via elastic bodies placed on at least either side of the two sides, wherein at least a front surface of the elastic body on the side that faces the foregoing contact body is circular, and wherein:

an outer diameter D1 of the circular front surface of the elastic body is smaller than an outer diameter D2 which is the smaller one of an outer diameter of the master information carrier and an outer diameter of the slave medium.

2. A magnetic transfer holder as defined in claim 1, wherein a difference between the outer diameter D1 and the outer diameter D2 is between 0.2 mm and 4 mm, inclusive.

3. A magnetic transfer holder as defined in claim 1, wherein the outer diameter D1 is larger than an outer diameter D3 of the pattern area.

4. A magnetic transfer holder as defined in claim 3, wherein a difference between the outer diameter D1 and the outer diameter D3 is 4 mm or less.

5. A magnetic transfer holder as defined in claim 1, wherein at least one of the master information carrier and the slave medium has a center hole, the circular front surface of the elastic body has a center hole, and a diameter d1 of the center hole is larger than a diameter d2 which is the larger one of a diameter of the center hole of the master information carrier and a diameter of the center hole of the slave medium.

6. A magnetic transfer holder as defined in claim 5, wherein a difference between the diameter d1 and the diameter d2 is between 0.2 mm and 4 mm, inclusive.

7. A magnetic transfer holder as defined in claim 5, wherein the diameter d1 is smaller than an inner diameter d3 of the pattern area.

8. A magnetic transfer holder as defined in claim 1, wherein the thickness of the elastic body is between 0.1 mm and 3 mm.

9. A magnetic transfer holder as defined in claim 1, wherein Young's modulus of the elastic body is from 0.5 MPa to 200 MPa.

10. A magnetic transfer holder which sandwiches and holds therein a contact body comprising a discoid master information carrier having a toroidal pattern area bearing transfer information on a front surface and a discoid slave medium receiving transfer of the foregoing transfer information from the master information carrier, via elastic bodies placed on at least either side of the two sides, wherein at least a front surface of the elastic body on the side that faces the foregoing contact body is circular, and wherein:

at least one of the master information carrier and the slave medium has a center hole, the circular front surface of the elastic body has a center hole, and a diameter d1 of the center hole is larger than a diameter d2 which is the larger one of a diameter of the center hole of the master information carrier and a diameter of the center hole of the slave medium.

11. A magnetic transfer holder as defined in claim 10, wherein a difference between the diameter d1 and the diameter d2 is between 0.2 mm and 4 mm, inclusive.

12. A magnetic transfer holder as defined in claim 10, wherein the diameter d1 is smaller than an inner diameter d3 of the pattern area.

13. A magnetic transfer holder as defined in claim 12, wherein a difference between the diameter d1 and the diameter d3 is 4 mm or less.

14. A magnetic transfer holder as defined in claim 10, wherein the thickness of the elastic body is between 0.1 mm and 3 mm.

15. A magnetic transfer holder as defined in claim 10, wherein the Young's modulus of the elastic body is from 0.5 MPa to 200 MPa.

16. A magnetic transfer device which uses a magnetic transfer holder which sandwiches and holds therein a contact body comprising a discoid master information carrier having a toroidal pattern area bearing transfer information on a front surface and a discoid slave medium receiving transfer of the foregoing transfer information from the master information carrier, via elastic bodies placed on at least either side of the two sides, wherein at least a front surface of the elastic body on the side that faces the foregoing contact body is circular, and wherein an outer diameter D1 of the circular front surface of the elastic body is smaller than an outer diameter D2 which is the smaller one of an outer diameter of the master information carrier and an outer diameter of the slave medium, wherein:

magnetic transfer is performed in a state in which pressure is applied onto two sides of the contact body via the holder.

17. A magnetic transfer device as defined in claim 16, wherein a maximum value of pressure applied onto each portion of the pattern area is 2 MPa or less.

* * * * *